US006821498B2

(12) United States Patent
Vaughey et al.

(10) Patent No.: US 6,821,498 B2
(45) Date of Patent: Nov. 23, 2004

(54) OXYGEN ION CONDUCTING MATERIALS

(75) Inventors: John Vaughey, Elmhurst, IL (US); Michael Krumpelt, Naperville, IL (US); Xiaoping Wang, Downers Grove, IL (US); J. David Carter, Bolingbrook, IL (US)

(73) Assignee: The University of Chicago, Chicago, IL (US)

( * ) Notice: Subject to any disclaimer, the term of this patent is extended or adjusted under 35 U.S.C. 154(b) by 0 days.

(21) Appl. No.: 10/327,502

(22) Filed: Dec. 20, 2002

(65) Prior Publication Data

US 2003/0129115 A1 Jul. 10, 2003

Related U.S. Application Data

(62) Division of application No. 09/344,859, filed on Jun. 28, 1999, now Pat. No. 6,521,202.

(51) Int. Cl.[7] .............................................. C01G 45/12
(52) U.S. Cl. ................................. 423/599; 429/218.1
(58) Field of Search ........................... 423/593, 594, 423/595, 596, 598, 599; 502/593, 594, 595, 596, 598, 599, 600, 303, 525, 324; 429/218.1, 220, 221, 223, 224, 229, 231.5, 231.06

(56) References Cited

U.S. PATENT DOCUMENTS

| 3,884,837 A | 5/1975 | Remeika et al. |
| 3,901,828 A | 8/1975 | Mai et al. |
| 4,001,371 A | 1/1977 | Remeika et al. |
| 4,221,827 A | 9/1980 | Parry et al. |
| 4,601,883 A | 7/1986 | Sekido et al. |
| 4,892,862 A | 1/1990 | Ogushi et al. |
| 4,921,829 A | 5/1990 | Ozawa et al. |
| 4,957,718 A | 9/1990 | Yoo et al. |
| 5,183,799 A | 2/1993 | Ogushi et al. |
| 5,306,411 A | 4/1994 | Mazanec et al. |
| 5,432,024 A | 7/1995 | Soma et al. |
| 5,443,807 A | 8/1995 | Tang et al. |
| 5,559,073 A | 9/1996 | Hu et al. |
| 5,565,181 A | 10/1996 | Dieckmann et al. |
| 5,589,285 A | 12/1996 | Cable et al. |
| 5,759,936 A | 6/1998 | Christiansen et al. |
| 5,766,317 A | 6/1998 | Cable et al. |
| 5,820,654 A | 10/1998 | Gottzman et al. |
| 5,882,616 A | 3/1999 | Ziebarth et al. |
| 5,888,272 A | 3/1999 | Prasad et al. |
| 5,910,238 A | 6/1999 | Cable et al. |
| 5,911,860 A | 6/1999 | Chen et al. |
| 5,981,445 A | 11/1999 | Kirchnerova et al. |
| 6,197,719 B1 | 3/2001 | Choudhary et al. |
| 6,284,210 B1 | 9/2001 | Euzen et al. |
| 6,352,955 B1 | 3/2002 | Golden |

*Primary Examiner*—Stanley S. Silverman
*Assistant Examiner*—Edward M. Johnson
(74) *Attorney, Agent, or Firm*—Foley & Lardner LLP

(57) ABSTRACT

An oxygen ion conducting ceramic oxide that has applications in industry including fuel cells, oxygen pumps, oxygen sensors, and separation membranes. The material is based on the idea that substituting a dopant into the host perovskite lattice of $(La,Sr)MnO_3$ that prefers a coordination number lower than 6 will induce oxygen ion vacancies to form in the lattice. Because the oxygen ion conductivity of $(La,Sr)MnO_3$ is low over a very large temperature range, the material exhibits a high overpotential when used. The inclusion of oxygen vacancies into the lattice by doping the material has been found to maintain the desirable properties of $(La,Sr)MnO_3$, while significantly decreasing the experimentally observed overpotential.

11 Claims, 2 Drawing Sheets

OXYGEN ION CONDUCTING MATERIALS

This Application is a division of Ser. No. 09/344,859 filed on Jun. 28, 1999 now U.S. Pat. No. 6,521,202.

This invention was made with Government support under Contract No. W-31-1109-ENG-38 awarded by the U.S. Department of Energy. The Government has certain rights in this invention.

FIELD OF THE INVENTION

The present invention relates to improved oxygen ion conducting materials, useful in, for example, ceramic electrolyte devices. More particularly, the invention relates to a class of materials that maintains the excellent conductivity and catalytic properties of undoped lanthanum manganese oxide or of an A-site doped lanthanum manganite perovskite material, while increasing oxide ion conductivity in the material. This increase is realized by a significantly lower overpotential and better performance compared to other unsubstituted or A-site substituted materials.

BACKGROUND OF THE INVENTION

Ceramic electrolyte devices have a myriad of commercial uses in many devices that require oxygen anion conductivity, ranging from power generation in the form of solid oxide fuel cells to oxygen pumps, oxygen sensors, and air separation membranes. A ceramic electrolyte device comprises three separate parts: (1) a cathode that reduces elemental oxygen to oxide ions, (2) an electrolyte that transports the oxide ions, but not electrons, across a cell to an anode, and (3) the anode, where the oxide ions react with protons to form water. Currently, the material most commonly used for the cathode for these electrolyte devices is a doped lanthanum manganite, $(La,A)MnO_3$, a perovskite oxide, where A=Ca or Sr, wherein only the lanthanum position is doped. In this class of materials, where oxide examples are denoted as $ABO_3$, the large A-cation is typically a lanthanide, alkaline earth metal, or alkali metal cation in 7–12 coordination to oxygen. The B-cation is typically a transition or main group metal in octahedral coordination to oxygen. The compound $LaMnO_3$ has advantages in two of the three main requirements for a ceramic electrolyte device material: good electrical conductivity and catalytic activity for oxygen reduction; however, it exhibits poor oxygen ion conductivity. The poor oxygen ion conductivity problem can be partly solved by maximizing the number of triple point boundaries in the cathode, but this solution requires careful manipulation of particle sizes and complex fabrication of the ceramic-electrolyte interface.

For $LaMnO_3$ based ceramic electrolyte devices, one of the main limitations to the technology is that overpotential in the system is too high, causing unnecessary energy loss and inefficiencies. Presently when used in solid oxide fuel cells, typical $LaMnO_3$ based cathodes have an overpotential of roughly 60 mV. For the cell to run more efficiently, the overpotential must be lowered. The overpotential can be lowered by increasing the oxygen ion conductivity of the cathode.

A generally accepted method for introducing oxide ion conductivity into ceramic oxides is to substitute a lower valent element for the principle cation. For example, in zirconia, $ZrO_2$, vacancies can be introduced by addition of yttria ($Y_2O_3$) or calcium oxide (CaO), to form, for example, $Zr_{1-x}Y_xO_{2-x/2}$. In these instances, charge compensation is oxygen loss rather than reduction of zirconium cations. In other systems, such as $Li_xNi_{1-x}O$, an effect of substituting lithium cations for nickel is oxidation of the nickel cations, rather than oxygen loss. It is a balance between these two separate equilibriums that is a key factor in increasing utility of the $LaMnO_3$ system for ceramic electrolyte devices. Even in doped $LaMnO_3$ systems, such as $(La_{1-x}Sr_x)MnO_3$, a preponderance of the doping is compensated for by oxidation of the manganese cations rather than oxygen loss. A 1989 study by Kuo, Anderson, and Sparlin [*J. Solid State Chem.* 83, 52–60 (1989)] on the effect of oxygen partial pressure on a charge compensation mechanism for a doped material $(La_{0.80}Sr_{0.20})MnO_3$ showed that manganese oxidation was favored in all cases where $pO_2$ was greater than $10^{-12}$ atm at 1000° C. and $10^{-10}$ atm at 1200° C. In either case, no significant oxide ion vacancy formation was observed. These findings are significant because most ceramic electrolyte cathodes operate under conditions using a $pO_2$ range of $10^{-2}$–$10^{-3}$ atm, well within the oxygen stoichiometric regime for doped $LaMnO_3$ materials. There is still a need, therefore, to develop new ceramic electrolyte electrode materials that maintain excellent conductivity and catalytic properties of $LaMnO_3$ cathode materials while increasing their intrinsic oxide ion conductivity under realistic oxygen concentrations.

It is therefore an object of the present invention to provide novel oxygen ion conducting materials and compositions.

It is another object of the present invention to provide a novel lanthanum manganite material that maintains excellent conductivity and catalytic properties, while also increasing oxide ion conductivity in the material.

It is another object of the invention to provide a novel method for decreasing overpotential of electrode materials.

Other objects and advantages of the invention will become apparent by review of the detailed description of preferred embodiments.

SUMMARY OF THE INVENTION

The present invention is directed to an adjustment to a composition of lanthanum manganite electrolytes in order to enhance conductivity of oxygen ions. Lanthanum manganites are commonly used as electrodes in solid oxide fuel cells, oxygen pumps and air separation devices. They are doped with strontium or calcium and have good electrical conductivity and catalytic activity but poor oxygen ion conductivity, manifested in the form of a high overpotential in fuel cells. This invention is generally concerned with substitution of a lower or equal valent element for the principal cation which will increase the oxygen ion conductivity through creation of oxygen vacancies in the perovskite lattice. By increasing the oxygen ion conductivity of lanthanum manganite, energy efficiency of the system is increased, as is the material's potential utility at different temperatures.

The above described objects and embodiments are set forth in the following description and illustrated in the drawings described hereinbelow.

DETAILED DESCRIPTION OF THE PREFERRED EMBODIMENTS

Figure 1:
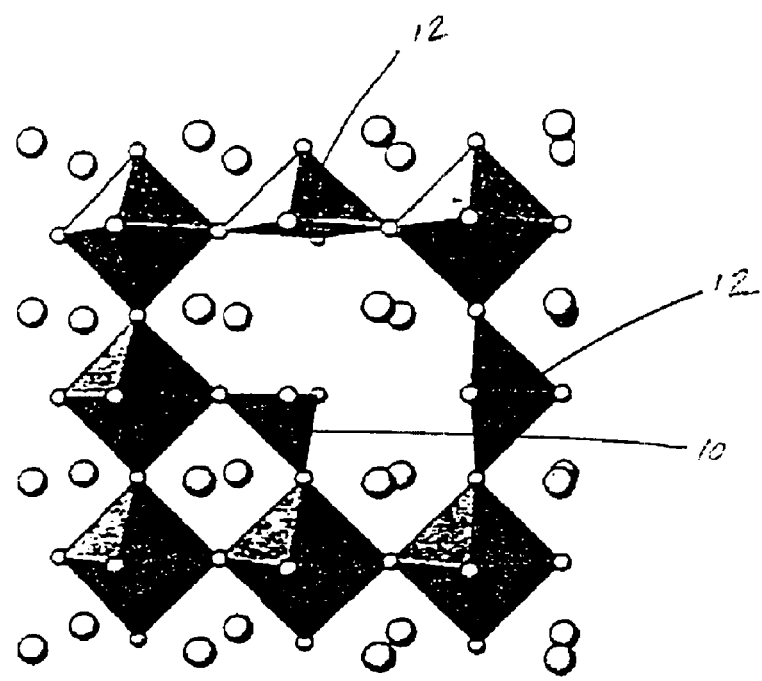
FIG. 1 illustrates the effect that substituting a tetrahedral cation into a perovskite lattice has on surrounding cations.

This invention is directed to oxygen ion conducting materials and compositions, and more particularly to doped ceramic perovskites having a general formula AA'BB'O$_x$, wherein A and B are selected elements, A' and B' are selected dopants for the elements A and B, respectively, O is oxygen, and x represents the amount of oxygen. In general, A is a lanthanide or Y, and more suitably a lanthanide with preferred members being elements of the group La to Gd in the periodic table. A' is an alkaline earth metal with preferred members being Mg, Ca, Sr, and Ba. Furthermore, B is a metal having multiple valances, such as manganese. B' is further characterized as having a coordination geometry below that for B and preferably 5 or below. Usually, the coordination geometry for B is octahedral and the coordination geometry for B' is tetrahedral. The difference in the coordination geometry for each metal contributes to a seeding of the framework with an increase in oxygen ion vacancies thereby improving the oxygen ion conductivity and reducing the overpotential. More particularly, B is a first row transition metal, more suitably an element of group 5 (Vanadium) to group 11 (Cu) and preferably Mn to Ni. B' is a late transition metal (Groups 8–12 (Fe—Zn)) or a main group metal (Groups 13,14,15) with preferred members being Zn, Ga, Al and Ge.

These materials exhibit favorable oxygen ion conductivity and are therefore useful as oxygen ion conducting components for fuel cells, particularly cathodes for solid oxide fuel cells, oxygen pumps, air separation units, and other products. The present invention further includes, in addition to these new compositions, oxygen ion conducting electrodes and other devices, and apparatus with these oxygen ion conducting components and devices.

This invention is particularly directed to electrode materials for ceramic electrolyte devices wherein the electrode materials comprise a doped lanthanum manganese oxide perovskite material of a general formula La$_{1-x}$A'$_x$Mn$_{1-y}$B'$_y$O$_{3-\delta}$ (0<x<1; 0.01<y<0.20; B'=Al, Ga, Zn, Cu, Ni; A'=Ca, Sr). This class of materials, based on LaMnO$_3$, maintains excellent conductivity and catalytic properties, as in the undoped material, while also increasing oxide ion conductivity in the material. This increase is realized by a significantly lower overpotential and better performance compared to other unsubstituted materials, where doping is restricted to A-site cation substitutions.

Significant decreases in overpotential of electrode materials can be achieved by substituting a small percentage of a metal that strongly prefers a lower coordination number compared to the manganese cations in the parent material. In the perovskite structure, the coordination geometry of the smaller (i.e., manganese) cation is octahedral. In instances where significant oxygen ion activity is expected, the ions moving through the structure do so by a percolation mechanism. In this type of mechanism, as oxide ions enter the cathode material, they fill surface vacancies in the perovskite framework and gradually work their way through the material by hopping from vacancy to vacancy through the coordination sphere of the smaller B-cation. One problem is that oxide ion vacancy concentration in LaMnO$_3$ materials is low, even when doping on the A-site with strontium or calcium cations. This substitution increases electrical conductivity of the compound, but does not increase ionic conductivity significantly.

In one form of the present invention, increasing ion conductivity has been achieved by substituting a small amount of a metal cation on the manganese site that has a strong preference for a coordination number lower than six. One example of this coordination geometry is tetrahedral or four coordination of oxygen. In this instance, adding such a cation seeds the framework with oxide ion vacancies. Because all of the octahedra in the parent structure share common corners, adding a four coordinate cation would then locally break up this arrangement and cause two of the surrounding manganese cations to also lose oxygen ions from their coordination sphere. A representation of substitution of a tetrahedral cation into the perovskite lattice and the effect of the substitution on the surrounding cations is shown in FIG. 1. A tetrahedral cation 10, in the center of FIG. 1, causes two of the adjacent octahedrally coordinated cations 12 to have a lower coordination number. Examples of this coordination geometry for a Mn(III) cation are known, i.e. Ca$_2$Mn$_2$O$_5$, so no unusual constraints are added to the structure. An important consideration is that the amount of dopant should be kept to a minimum in order to prevent clustering or sharing of vacancies by adjacent dopant cations. This is most effectively and easily accomplished by keeping the amount of dopant low.

The following non-limiting examples serve to further illustrate advantages of the disclosed invention.

EXAMPLE 1

Figure 2:
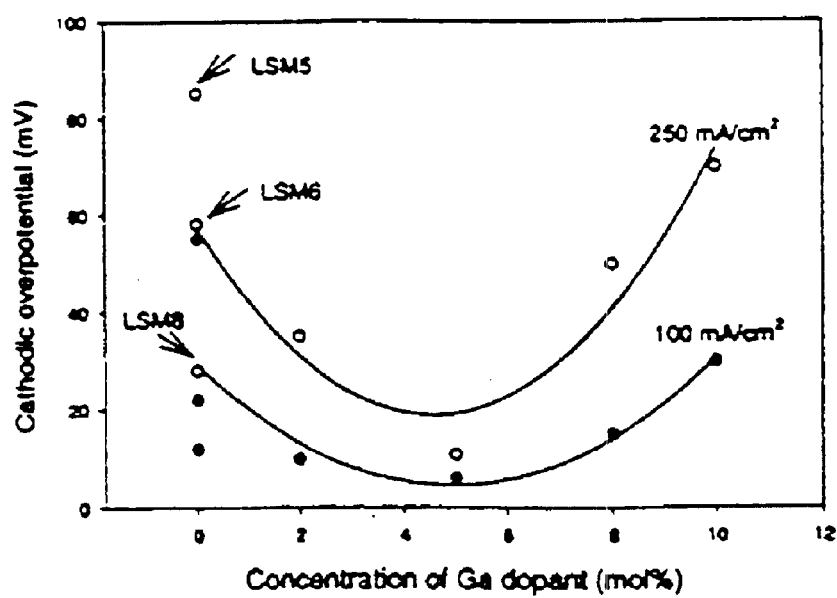
FIG. 2 is a plot of measured overpotential in a cell vs. gallium concentration in a cathode.

In studying the effect of the addition of a number of cations to material that has a strong tendency for four coordination to LaMnO$_3$, the use of gallium cations was studied as a dopant in this system. Typical materials were synthesized by a glycine nitrate method and subsequently calcined in air at 1250° C. All samples were then screened for activity as a cathode by determining polarization behavior at 1000° C. in air in a half fuel cell arrangement. The ratio of lanthanum and strontium were varied to establish single phase materials, as determined by powder X-ray diffraction, and the amount of gallium doped into the sample was varied. FIG. 2 is a plot of observed overpotential versus gallium concentration. The three points at zero Ga dopant concentration were obtained from the electrode compositions of La$_{0.54}$Sr$_{0.45}$MnO$_3$ (LSM5), La$_{0.59}$Sr$_{0.4}$MnO$_3$ (LSM6), and La$_{0.79}$Sr$_{0.2}$MnO$_3$ (LSM8), respectively. Although overpotential varies with Sr content in LSM without Ga doping, in FIG. 2 it is evident that substitution of gallium for manganese strongly effects the overpotential in the system. The minima of the semicircle is approximately 5% gallium and provides the best performance. The optimized formulation is (La$_{0.55}$Sr$_{0.45}$)$_{0.99}$Mn$_{0.95}$Ga$_{0.05}$O$_{3-\delta}$.

Substitutions with aluminum and zinc are also believed to be able to produce vacancy patterns similar to those observed for gallium. Nickel also substitutes as a four coordinate cation, but has a preference for square planar coordination in the solid state. Divalent copper dopants prefer five coordination in solid state oxides (square pyramidal) while trivalent copper (III) dopants, like nickel (II), prefer square planar configurations.

EXAMPLE 2

Figure 3:
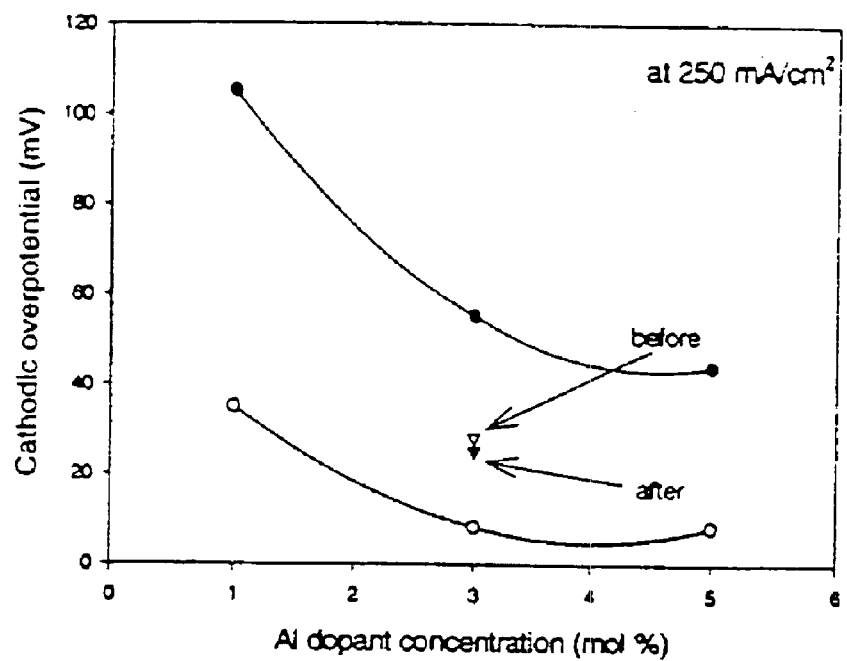
FIG. 3 is a plot of the change in overpotential as a function of dopant concentration.

FIG. 3 shows the effect of changing the aluminum dopant concentration on the overpotential of the Al-doped LSM cathode at a current density of 250 mA/cm$^2$. The smooth curves in FIG. 3 were obtained using the same material for both the anode and cathode, both before and after current conditioning at 360 mA/cm$^2$ over a week. After long term current conditioning, anode degradation was observed, as indicated by a great increase in the terminal voltage between the anode and its reference electrode. In order to eliminate the effects of the anode degradation, similar experiments were performed using the 3% Al-doped cathode with a platinum anode in a half-cell configuration. The results are shown in triangles in FIG. 3. As can be seen, excellent performance of the cathode is maintained when compared to standard LSM materials (approximately 60 mV) with the alternative anodes.

Figure 4:
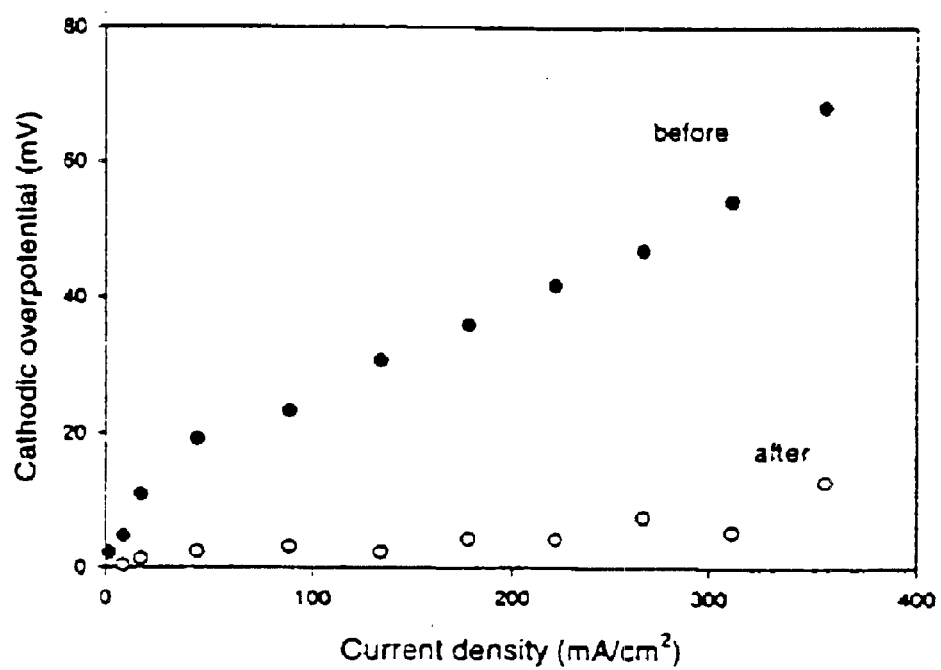
FIG. 4 is a graph showing the effect of current conditioning for a typical cathode.

FIG. 4 shows a typical example of a polarization curve obtained from the 5% Al-doped LSM cathode before and after current conditioning at 356 mA/cm$^2$ for 5 days. The typical data shown in FIG. 4 highlights the excellent performance and stability of the material after current conditioning.

While preferred embodiments have been illustrated and described, it should be understood that changes and modifications can be made therein in accordance with one of ordinary skill in the art without departing from the invention in its broader aspects. Various features of the invention are defined in the following claims.

What is claimed is:

1. A process for producing a perovskite material having increased oxygen ion conductivity, comprising seeding the framework of a lanthanum manganese oxide perovskite material with oxide ion vacancies by doping a Mn site of the lanthanum manganese oxide perovskite material with a B' dopant having a coordination geometry less than a coordination geometry of the Mn site, wherein the lanthanum manganese oxide perovskite material has a formula $La_{1-x}A'_xMn_{1-y}B'_yO_{3-\delta}$, wherein:

x is between 0 and 1;

y is between 0.01 and 0.20;

A' is selected from the group consisting of Ca and Sr; and

B' is selected from the group consisting of Al, Ga, Zn, Cu, and Ni.

2. The process of claim 1 wherein the coordination geometry of B' is 5 or less.

3. The process of claim 1 wherein the coordination geometry of B' is tetrahedral.

4. A process for increasing the efficiency of a ceramic electrolyte device, comprising performing a reduction of elemental oxygen to form water using a perovskite material produced by the process of claim 1 as an electrode of a ceramic electrolyte device.

5. The process of claim 4 wherein the ceramic electrolyte device is a solid oxide fuel cell.

6. The process of claim 4 wherein the ceramic electrolyte device is an oxygen pump or an air separation unit.

7. The process of claim 4 wherein the electrode is a cathode.

8. A process for producing a perovskite material having increased oxygen ion conductivity, comprising seeding the framework of a perovskite material with oxide ion vacancies by doping a B site in the perovskite lattice with a B' dopant having a coordination geometry less than a coordination geometry of the B site, wherein the coordination geometry of B' is 5 or less, and the perovskite has a formula $AA'BB'O_X$ in which:

A is an element selected from the group consisting of lanthanides and yttrium;

A' is a dopant for A and is an alkaline earth metal;

B is a metal having a coordination geometry;

B' is a dopant for B and is an element selected from Groups 8–15 of the Periodic Table; and x represents the amount of oxygen.

9. A process for producing a perovskite material having increased oxygen ion conductivity, comprising seeding the framework of a perovskite material with oxide ion vacancies by doping a B site in the perovskite lattice with a B' dopant having a coordination geometry less than a coordination geometry of the B sits wherein the coordination geometry of B' is tetrahedral, and the perovskite has a formula $AA'BB'O_X$ in which:

A is an element selected from the group consisting of lanthanides and yttrium;

A' is a dopant for A and is an alkaline earth metal;

B is a metal having a coordination geometry;

B' is a dopant for B and is an element selected from Groups 8–15 of the Periodic Table; and x represents the amount of oxygen.

10. A process for producing a perovskite material having increased oxygen ion conductivity, comprising seeding the framework of a perovskite material with oxide ion vacancies by doping a B site in the perovskite lattice with a B' dopant having a coordination geometry less than a coordination geometry of the B site, wherein the perovskite is produced by a glycine nitrate synthesis and has a formula $AA'BB'O_X$ in which:

A is an element selected from the group consisting of lanthanides and yttrium;

A' is a dopant for A and is an alkaline earth metal;

B is a metal having a coordination geometry;

B' is a dopant for B and is an element selected from Groups 8–15 of the Periodic Table; and x represents the amount of oxygen.

11. A process for producing a perovskite material having increased oxygen ion conductivity, comprising seeding the framework of a perovskite material with oxide ion vacancies by doping a B site in the perovskite lattice with a B' dopant having a coordination geometry less than a coordination geometry of the B site, wherein the B site is doped with an amount of B' dopant such that there are substantially no clustered or shared oxide ion vacancies, and the perovskite has a formula $AA'BB'O_X$ in which:

A is an element selected from the group consisting of lanthanides and yttrium;

A' is a dopant for A and is an alkaline earth metal;

B is a metal having a coordination geometry;

B' is a dopant for B and is an element selected from Groups 8–15 of the Periodic Table; and x represents the amount of oxygen.

* * * * *

UNITED STATES PATENT AND TRADEMARK OFFICE
CERTIFICATE OF CORRECTION

PATENT NO. : 6,821,498 B2 Page 1 of 1
DATED : November 23, 2004
INVENTOR(S) : John Vaughey et al.

It is certified that error appears in the above-identified patent and that said Letters Patent is hereby corrected as shown below:

Column 1,
Line 6, "W-31-1109-ENG-38" is changed to -- W-31-109-ENG-38 --.

Column 6,
Line 13, "sits" is changed to -- site --.

Signed and Sealed this

First Day of March, 2005

JON W. DUDAS
*Director of the United States Patent and Trademark Office*